Nov. 13, 1923.

C. A. CULVER 1,474,242

ACOUSTIC RECEIVING APPARATUS

Filed Oct. 23, 1919      5 Sheets-Sheet 1

INVENTOR
Charles A. Culver
BY
Robert H. Young
Attorney

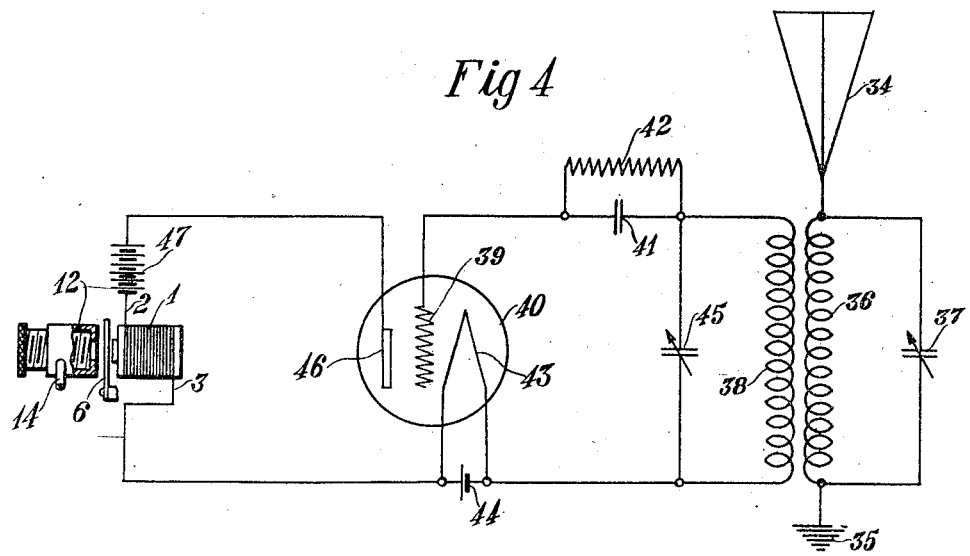
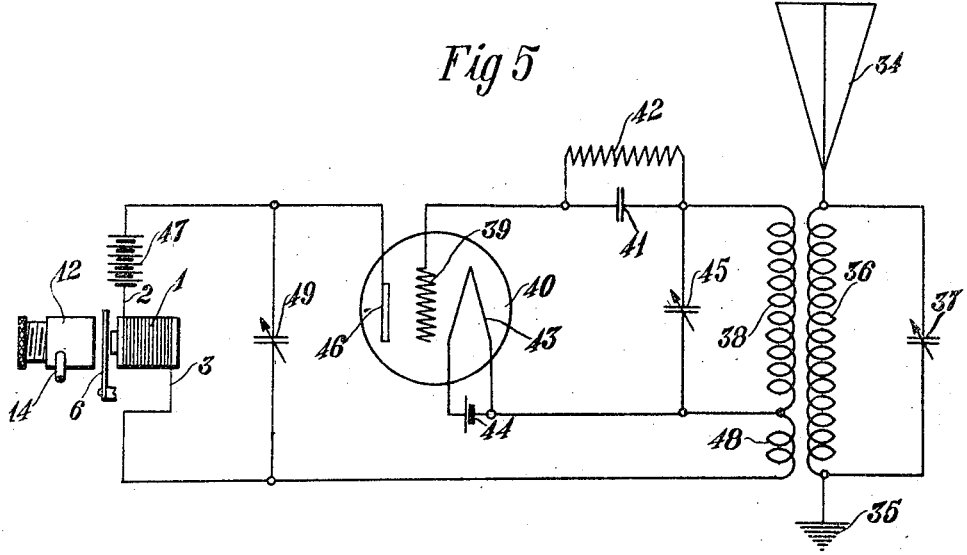

Nov. 13, 1923.   
C. A. CULVER   
1,474,242
ACOUSTIC RECEIVING APPARATUS
Filed Oct. 23, 1919    5 Sheets-Sheet 3
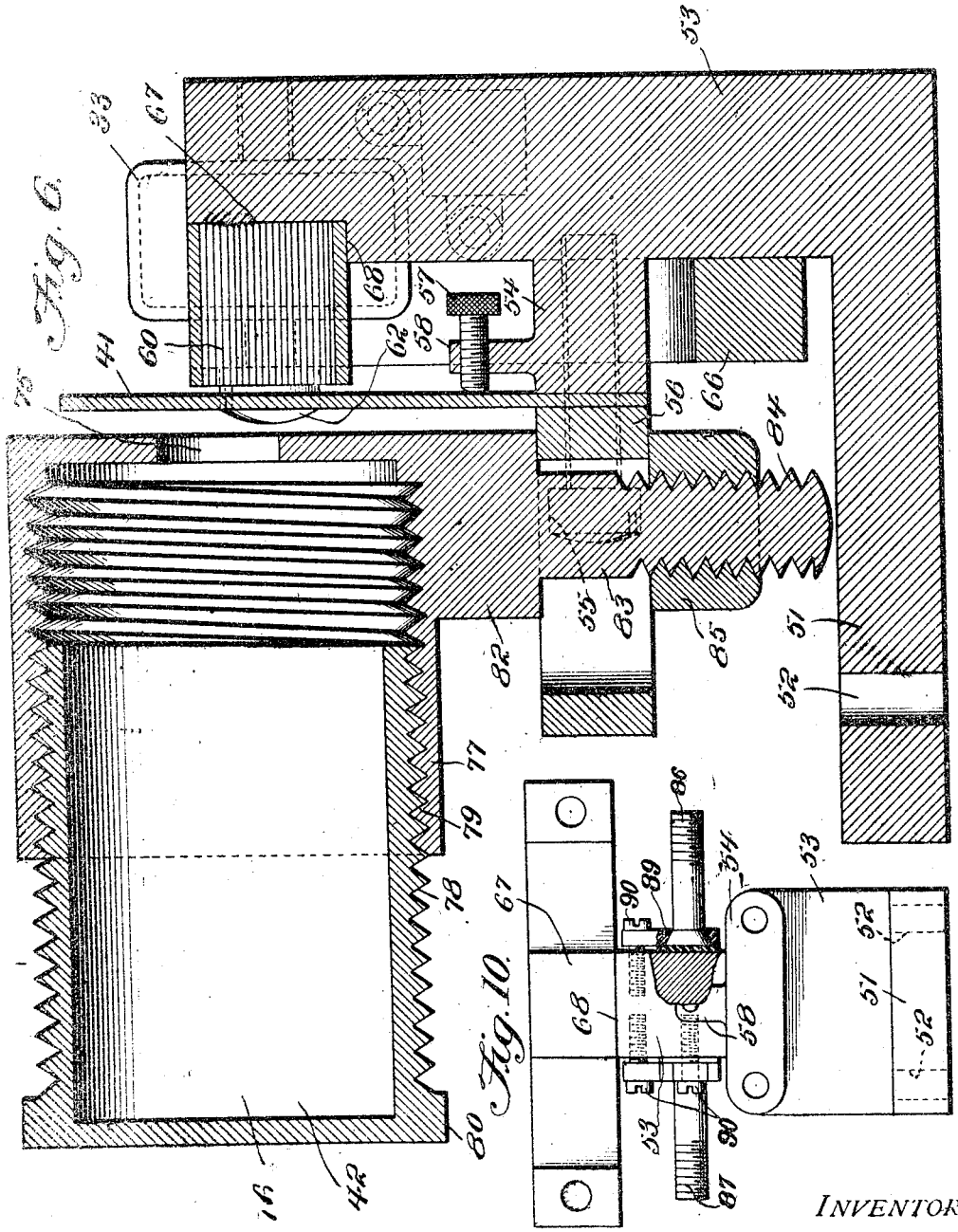
INVENTOR  
Charles A. Culver  
BY Robert H. Young  
Attorney

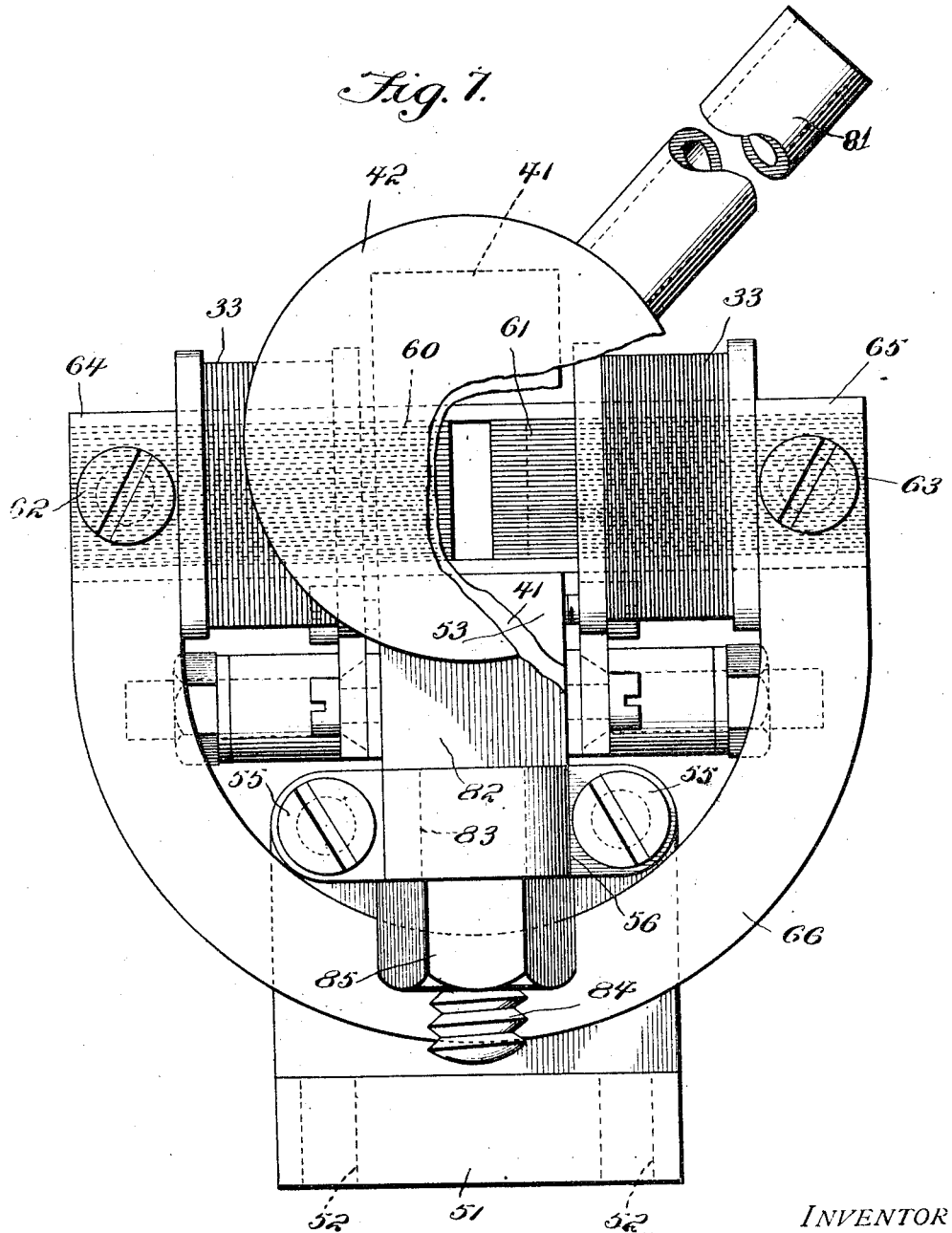

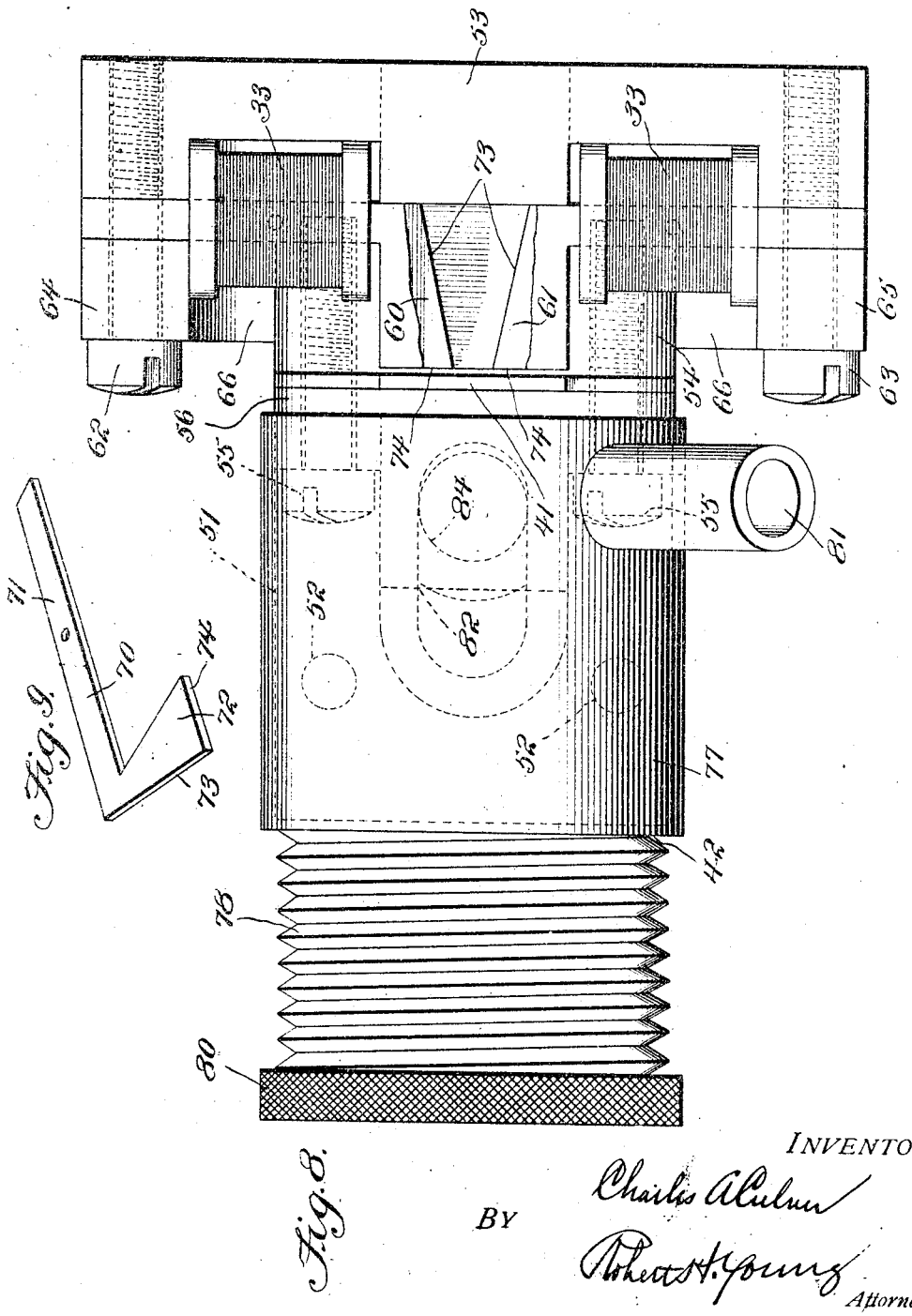

Patented Nov. 13, 1923.

1,474,242

UNITED STATES PATENT OFFICE.

CHARLES A. CULVER, OF BELOIT, WISCONSIN.

ACOUSTIC RECEIVING APPARATUS.

Application filed October 23, 1919. Serial No. 332,755.

*To all whom it may concern:*

Be it known that I, CHARLES A. CULVER, a citizen of the United States, residing at Beloit, in the county of Rock and State of Wisconsin, have invented certain new and useful Improvements in Acoustic Receiving Apparatus, of which the following is a specification.

This invention relates to an improved apparatus for transmuting electrical impulses into audible sounds.

An object of the invention is the provision of improved audible means for indicating received signalling oscillations or other communications, particularly for detecting or indicating relatively faint signals. A further object is the provision of audible means arranged in coaction with suitable oscillation receiving circuits to selectively receive damped or undamped transmitted signalling oscillations.

The invention comprises selective impulse receiving means embodying selective means for transmuting the received impulses into audible sounds. In accordance with the more preferred forms of the invention, applicable for radio communication, the invention comprises means for selectively transmuting the vibrations of an electro-mechanically vibrated member into audible sounds, coacting with selectively receiving means. Such vibratable member is preferably a reed, of the free reed type, and provided with means for adjusting its effective length, or frequency.

Other features and objects of the invention will be more fully understood from the following description and the accompanying drawings, in which—

Fig. 4 is a diagram of a radio receiving system embodying my invention, adapted for selectively receiving damped signalling waves;

Fig. 5 is a diagram of a radio receiving system embodying my invention, adapted for selectively receiving undamped waves;

Fig. 6 is a vertical, central sectional elevation of a preferred form of the invention; shown on an enlarged scale;

Figs. 7 and 8 are respectively front end and top plan views of Fig. 6;

Fig. 9 is a detail perspective view of a laminated core element shown in Fig. 6; and Figure 10 is a vertical elevation, on a somewhat reduced scale, of the base and standard, as viewed from the left in Fig. 6, with the coils, reed, resonance chamber and other removable parts removed.

Figure 1:
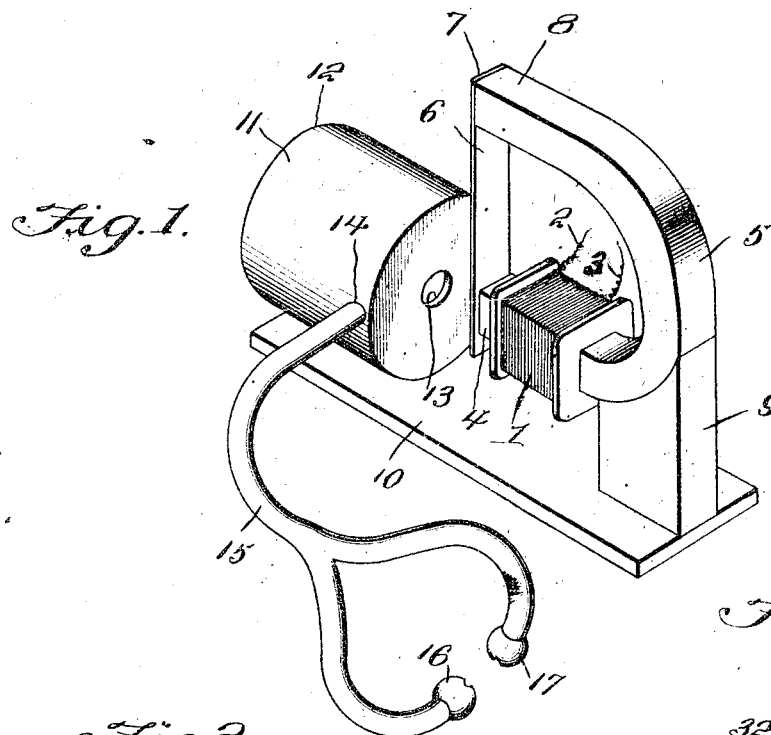
Fig. 1 is a perspective view of one form of my invention.
Figure 2:
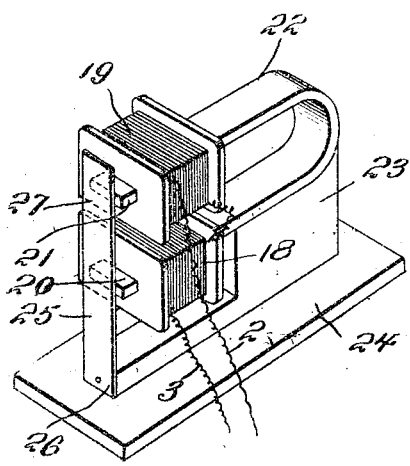
Fig. 2 is a similar view of another form of my invention.
Figure 3:
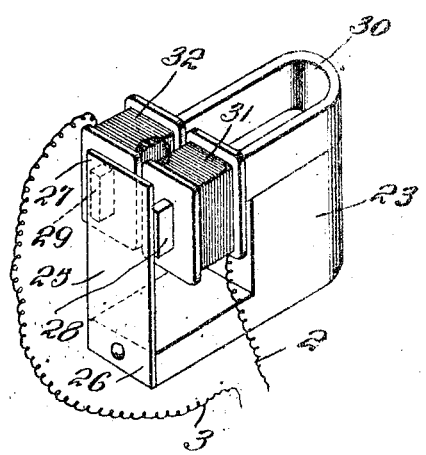
Fig. 3 is a similar view of a further modification of my invention.

Referring to the forms of my invention shown in Figs 1, 2 and 3, the coil 1, having the terminals 2, 3, is constructed and arranged to receive electrical oscillations or other forms of signal impulses. In the form of the invention shown in Fig. 1, the coil 1 is mounted on a pole 4 of the magnet 5, the same being in electromagnetic relation with the reed 6, the end 7 of the reed 6 being suitably suspended, as from the pole 8 of the magnet 5.

The magnet 5 may be arranged to have its pole 8 disposed vertically above its pole 4, and mounted on a bracket 9 having the support 10.

In acoustical relation with the reed 6 is arranged the resonant device 11, shown in the form of a resonance chamber, of cylindrical cross-section having one end 12 closed and provided with the sound receiving opening 13. The chamber 11 is provided with suitable sound emitting means such as the opening 14, preferably having the sound emitting means 15 shown as a binaural having ear tips 16 and 17.

Thus, upon the reception of signalling waves or other electrical impulses, the coil 1 is energized, thereby electro-mechanically vibrating the reed 6 in correspondence with the intervals or modulations of the received impulses.

The resonance chamber 11 serves to amplify the vibrations or sounds emitted by the reed 6, and upon adjustment of the chamber 11 in its fundamental tone in consonance with the reed, the amplified sound waves emitted through the opening 14 enable the signals or other communication to be heard by the operator at a distance.

The binaural 15 serves to eliminate extraneous sounds, and to amplify relatively weak signals.

The form of the invention shown in Fig. 2 is similar to that shown in Fig. 1 except in respect to the arrangement of the oscillation-sensitive coil relative to the magnet.

In Fig. 2, the oscillation-sensitive coil is formed of two individual coils 18, 19 respectively mounted on the poles 20, 21 of the magnet 22. The magnet 22 may be supported on a suitable bracket 23 having the base 24. The reed 25 is shown suspended at its lower end 26 on the bracket 23 and the free end 27 of the reed 25 arranged in vibratable relation with the poles 20, 21 of the magnet 22. The individual coils 18, 19 are preferably wound in opposite directions, whereby to produce opposing magnetic fields respectively co-acting with the opposing magnetic poles 20, 21. The poles 20, 21 are shown arranged in substantial alignment with the direction of length of the reed 25.

The operation of the form of my invention shown in Fig. 2 is similar to that of Fig. 1, and the reed 25 may be provided with a similar resonance device for amplifying the transmuted signals.

Fig. 3 shows a modification similar to that shown in Fig. 2, excepting that the poles 28, 29 of the magnet 30 are arranged transversely with respect to the direction of length of the reed 25.

As illustrative of the use of my impulse transmuting means and in disclosure of other features of my invention, I have shown in Fig. 4 a radio receiving system arranged for selectively receiving damped oscillations and in Fig. 5 a radio receiving system arranged for selectively receiving undamped oscillations. Like elements are designated by like reference characters.

In Fig. 4, the antenna 34, grounded at 35, is connected to the primary coil 36 forming a tuning circuit with the adjustable condenser 37; said primary 36 is coupled with the secondary coil 38, one terminal of which is connected to the grid 39 of the vacuum oscillation tube 40 to which is also connected the condenser 41 and grid "leak" resistance 42. The other terminal of the secondary 38 is connected to cathode filament 43, of the vacuum tube 40. The filament 43 is heated in the usual manner by means of its battery 44.

The terminals of the secondary 38 are bridged by the adjustable condenser 45. The anode 46, of the vacuum tube 40 is connected to storage or other suitable battery 47 and the terminals 2, 3, of the oscillation coil 1, coacting as above described with a reed 6 and a transmuting chamber 12, shown diagrammatically as adjustable, as more fully disclosed hereinafter.

In the system shown in Fig. 5, for receiving undamped waves, the supplemental secondary coil 48 is connected to one terminal 3 of the oscillation coil 1 and the adjustable condenser 49 connected across the coil 1 and the battery 47.

In Figs. 6 to 10 inclusive, I have indicated a preferred form of unit mounting arrangement of the reed 41, oscillation-sensitive coils 33, 33, and the adjustable amplifying resonance chamber 42.

Such unit arrangement comprises the supporting base 51 provided with the recesses 52 for the reception of suitable means for securing the base 51 to a suitable support. The base 51 is provided with the vertically extending standard 53, of suitable non-magnetic material, which may be integral with the base 51. The reed 41 is mounted on the lug 54, extending horizontally from the standard 53; the reed 41 is secured adjacent its end to the lug 54 by means of the set-bolts 55 and strap 56. The reed 41 may be provided with the amplitude-limiting means comprising the set screw 57, mounted in threaded relation with the lug 58, extending vertically from the horizontal lug 54.

The oscillation-sensitive coils 33, 33 are respectively mounted in opposite relation on the laminated pole pieces 60, 61, respectively clamped by means of the bolts 62, 63, to the ends 64, 65, of the permanent magnet 68, see Fig. 7. Such bolts 62, 63, extend through the respective sets of laminations 60, 61, and into the standard 53. The standard 53 is recessed at 67 to provide the ledge 68 for receiving and supporting the laminated poles 60, 61.

The poles 60, 61 are preferably formed of individually similarly cut laminæ, and in the arrangement shown I have found the form of lamina particularly indicated in Figs. 8 and 9 to be advantageous. As shown, each lamina 70 comprises a substantially rectangular body portion 71 and an end portion 72, having a face 73 extending transversely and somewhat forwardly in the direction of length of the rectangular body portion 71. The forward side face 74 is preferably of extended effective length, whereby the end portion 72 is of a general polygonal form. The resultant sets of laminæ 60, 61, as appears in plan in Fig. 8, provide an intensified magnetic field in immediate adjacency of the reed 41 and also provides for sufficient clearance for the coils 33, 33 with sufficient space between the respective parts to permit ready inspection, adjustment and repair.

In special relation with the reed 41 is disposed the inlet opening 75 of the resonance chamber 42. The adjustment of the resonance chamber 42 in the specific form shown is attained by telescoping the movable chamber portion 76 within the fixed chamber portion 77. To attain precise adjustment, the co-operating chamber portions 76, 77 are provided with the intermeshing threads 78, 79. The resonance chamber 42 is shown of the closed type. The manipulation of the movable chamber portion 76 is facilitated by milling its outer rim as indicated at 80.

The sound emitting opening 81 is located at any suitable position, and may be connected with a binaural, as indicated in Fig. 1, aforesaid.

The resonance chamber 42 is shown removably mounted on the standard 53, by means of the arm 82, extending downwardly of the chamber portion 77, and provided with the reduced extension 83 adapted to extend through a suitable opening in the lug 54, such extension 83 being threaded at its end 84 to receive the tightening nut 85.

The binding posts 86, are respectively mounted on the disks 88, 89 of insulation, secured respectively to the standard 53 by the nut screws 90. The binding posts 86, 87 receive the terminals of the oscillation coils 33 and the leads of the receiving circuit, arranged as hereinabove set forth.

Upon receiving undamped waves the reed 41 and the chamber 42 are respectively adjusted to the particular beat tone frequency of the waves, whereby the receiving system selectively responds solely to the impulses desired to be received. In receiving spark signals, the reed 41 and the resonant chamber 42 are respectively adjusted to the spark frequency of the transmitting station.

Accordingly, the system receives selectively through a plurality of adjustable selective means. The system is advantageous also in eliminating static or stray radiations.

The reed is formed with a low damping factor relative to the damping factor of the diaphragm of an ordinary telephone receiver, whereby the reed is relatively highly responsive solely to impulses of waves which are consonant with the natural period of vibration of the reed.

Whereas I have described my invention by reference to specific forms thereof, it will be understood that many changes and modifications may be made without departing from the spirit of the invention as defined by the appended claims.

I claim:

1. In a signalling device, an electromagnetic monotone system comprising an electro-magnetically vibrated reed supported at one end, in order to be fully responsive to vibrations of a single frequency, an electromagnet for vibrating said reed at one side of said reed, a resonance chamber normally in resonance with said reed vibrations at the other side of said reed for amplifying the intensity of sounds produced by said reed, and aural means for the reception of said sound waves.

2. In a signalling device, an electromagnetic monotone system comprising an electro-magnetically vibrated reed supported at one end, in order to be fully responsive to vibrations of a single frequency, means for adjusting the natural period of vibration of said reed, an electro-magnet for vibrating said reed at one side of said reed, a resonance chamber normally in resonance with said reed vibrations at the other side of said reed for amplifying the intensity of sounds produced by said reed, means for varying the period of resonance of said resonance chamber, and aural means for the reception of said sound waves.

In testimony whereof I affix my signature.

CHARLES A. CULVER.